United States Patent
Senkoji et al.

(10) Patent No.: US 9,140,822 B2
(45) Date of Patent: Sep. 22, 2015

(54) LONG-PERIOD VIBRATION SENSOR AND METHOD FOR CORRECTING OUTPUT VALUE OF THE LONG-PERIOD VIBRATION SENSOR

(75) Inventors: Daigo Senkoji, Kawasaki (JP); Hiroshi Yamakawa, Kawasaki (JP); Ken Matsushiro, Kawasaki (JP); Tomoharu Yamada, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 568 days.

(21) Appl. No.: 13/560,358

(22) Filed: Jul. 27, 2012

(65) Prior Publication Data

US 2013/0025346 A1  Jan. 31, 2013

(30) Foreign Application Priority Data

Jul. 29, 2011  (JP) ................. 2011-166549

(51) Int. Cl.
*G01P 21/00* (2006.01)
*G01V 13/00* (2006.01)
*G01V 1/18* (2006.01)

(52) U.S. Cl.
CPC ............. *G01V 13/00* (2013.01); *G01V 1/182* (2013.01)

(58) Field of Classification Search
None
See application file for complete search history.

(56) References Cited

U.S. PATENT DOCUMENTS

| 3,412,374 A | 11/1968 | Mitchell |
| 3,509,636 A | 5/1970 | Hansen |
| 7,347,097 B2 * | 3/2008 | Chernyak et al. .......... 73/514.17 |
| 2007/0179713 A1 | 8/2007 | Scott |
| 2010/0296366 A1 | 11/2010 | Kamata |
| 2011/0242933 A1 | 10/2011 | Maissant et al. |
| 2012/0120762 A1 | 5/2012 | Kamata |
| 2012/0314537 A1 | 12/2012 | Kamata |

FOREIGN PATENT DOCUMENTS

| JP | A-2006-201096 | 8/2006 |
| JP | 2010-175274 A | 8/2010 |
| JP | 2011-027445 A | 2/2011 |

(Continued)

OTHER PUBLICATIONS

Jan. 8, 2015 Extended European Search Report Issed in European Patent Application No. 12005470.5.

(Continued)

*Primary Examiner* — Robert R Raevis
(74) *Attorney, Agent, or Firm* — Oliff PLC

(57) ABSTRACT

A long-period vibration sensor includes an overdamped accelerometer including a magnet fixed to the inside of a casing, a detection coil disposed between magnetic poles formed due to the magnet, a bobbin configured to hold the detection coil, and a support spring configured to support the bobbin in the casing so that the bobbin can vibrate in a predetermined direction, a voltage being outputted from the detection coil when the bobbin is damped, a plurality of digital filters having different frequency characteristics from one another, a selection module configured to select one digital filter from the plurality of digital filters based on an output value of the voltage outputted from the overdamped accelerometer, and a correction module configured to correct the output value of the voltage outputted from the overdamped accelerometer using the digital filter selected by the selection module.

5 Claims, 7 Drawing Sheets

(56) References Cited

FOREIGN PATENT DOCUMENTS

| WO | 2006/076925 A1 | 7/2006 |
| WO | 2009/055117 A2 | 4/2009 |

OTHER PUBLICATIONS

Feb. 24, 2015 Office Action issued in Japanese Patent Application No. 2011-166549.

* cited by examiner

LONG-PERIOD VIBRATION SENSOR AND METHOD FOR CORRECTING OUTPUT VALUE OF THE LONG-PERIOD VIBRATION SENSOR

CROSS-REFERENCE TO RELATED APPLICATION(S)

The present application claims the benefit of priority of Japanese Patent Application No. 2011-166549, filed on Jul. 29, 2011. The disclosures of this application are incorporated herein by reference.

BACKGROUND

1. Technical Field

The present invention relates to a long-period vibration sensor and a method for correcting an output value of the long-period vibration sensor.

2. Related Art

In the related art, there has been known a vibration detector for detecting long-period vibrations when the long-period vibrations occur due to an earthquake or the like.

For example, a pendulum-type quake detection sensor has been proposed as a vibration detector in Patent Document 1. The pendulum-type quake detection sensor includes a pendulum which is suspended from the ceiling of a building through a wire, and a sensor which is disposed under the pendulum. The sensor irradiates a lower surface of the pendulum with light and receives the light reflected by the lower surface.

In such a pendulum-type quake detection sensor, a reflection surface is formed in the lower surface of the pendulum so that the light quantity of light reflected by the reflection surface varies sequentially from the center of the pendulum toward the outside in accordance with the amplitude of the pendulum. Thus, the light quantity of light reflected by the lower surface of the pendulum is detected so that the amplitude of the pendulum can be detected from the light quantity.

Besides the pendulum-type quake detection sensor, for example, a servo-type accelerometer which can carry out measurement from a DC region (still state) has been proposed as a vibration detector.

Such a servo-type accelerometer detects a displacement of a movable portion disposed in a casing, due to an external force. The servo-type accelerometer measures acceleration by measuring the amount of a current which is proportional to the displacement when the current is applied to a coil for driving the movable portion in order to keep the movable portion in a still state.

PRIOR TECHNICAL DOCUMENT

Patent Document

[Patent Document 1] JP-A-2006-201096

However, in the aforementioned pendulum-type quake detection sensor, the length of the wire must be set for each frequency of vibration to be detected. In addition, the site where the pendulum-type quake detection sensor can be installed is limited because the wire must be several meters long. Further, the level of detection cannot be changed easily in the pendulum-type quake detection sensor once setting has been done. Thus, the pendulum-type quake detection sensor is not user-friendly.

On the other hand, the servo-type accelerometer is indeed smaller in size than the pendulum-type quake detection sensor but it is necessary to always supply electric power to a servo circuit. Thus, the structure of the servo-type accelerometer is comparatively complicated, and the number of parts for the servo-type accelerometer is large.

Thus, an apparatus which is simple in structure, excellent in user-friendliness and low in power consumption is desired to detect long-period vibrations.

SUMMARY

One or more exemplary embodiments of the present invention provide a long-period vibration sensor which is simple in structure, excellent in user-friendliness and low in power consumption, and a method for correcting an output value of the long-period vibration sensor.

A long-period vibration sensor according to an exemplary embodiment of the invention, comprises:

an overdamped accelerometer including a casing, a magnet fixed to the inside of the casing, a detection coil disposed between magnetic poles formed due to the magnet, a bobbin configured to hold the detection coil, and a support spring configured to support the bobbin in the casing so that the bobbin can vibrate in a predetermined direction, a voltage being outputted from the detection coil when the bobbin is damped;

a plurality of digital filters having different frequency characteristics from one another;

a selection module configured to select one digital filter from the plurality of digital filters based on an output value of the voltage outputted from the overdamped accelerometer; and a correction module configured to correct the output value of the voltage outputted from the overdamped accelerometer using the digital filter selected by the selection module.

The long-period vibration sensor may further comprise:

a storage configured to store the plurality of digital filters and output values set for the plurality of digital filters respectively in advance in a state that the plurality of digital filters are associated with the corresponding output values, wherein:

with reference to the storage, the selection module is configured to select one digital filter from the plurality of digital filters based on the output value of the voltage outputted from the overdamped accelerometer.

The selection module may be configured to select one digital filter which can detect a frequency in a range of from 0.04 Hz to 0.5 Hz.

A method for correcting an output value of the long-period vibration sensor according to an exemplary embodiment of the invention, comprises:

outputting a voltage from the detection coil when the bobbin is damped;

selecting one digital filter from the plurality of digital filters based on an output value of the voltage outputted; and correcting the output value using the digital filter selected.

According to the invention, frequency characteristic of an overdamped accelerometer is corrected by a selected digital filter. Thus, long-period vibrations can be detected using the overdamped accelerometer which is not suitable for detecting the long-period vibrations.

It is therefore possible to provide a long-period vibration sensor which is simpler in structure, more excellent in user-friendliness and lower in power consumption than a servo-type accelerometer, and a method for correcting an output value of the long-period vibration sensor.

DETAILED DESCRIPTION

A long-period vibration sensor and a method for correcting an output value of the long-period vibration sensor according to the invention will be described below in detail with reference to the drawings.

Figure 1:
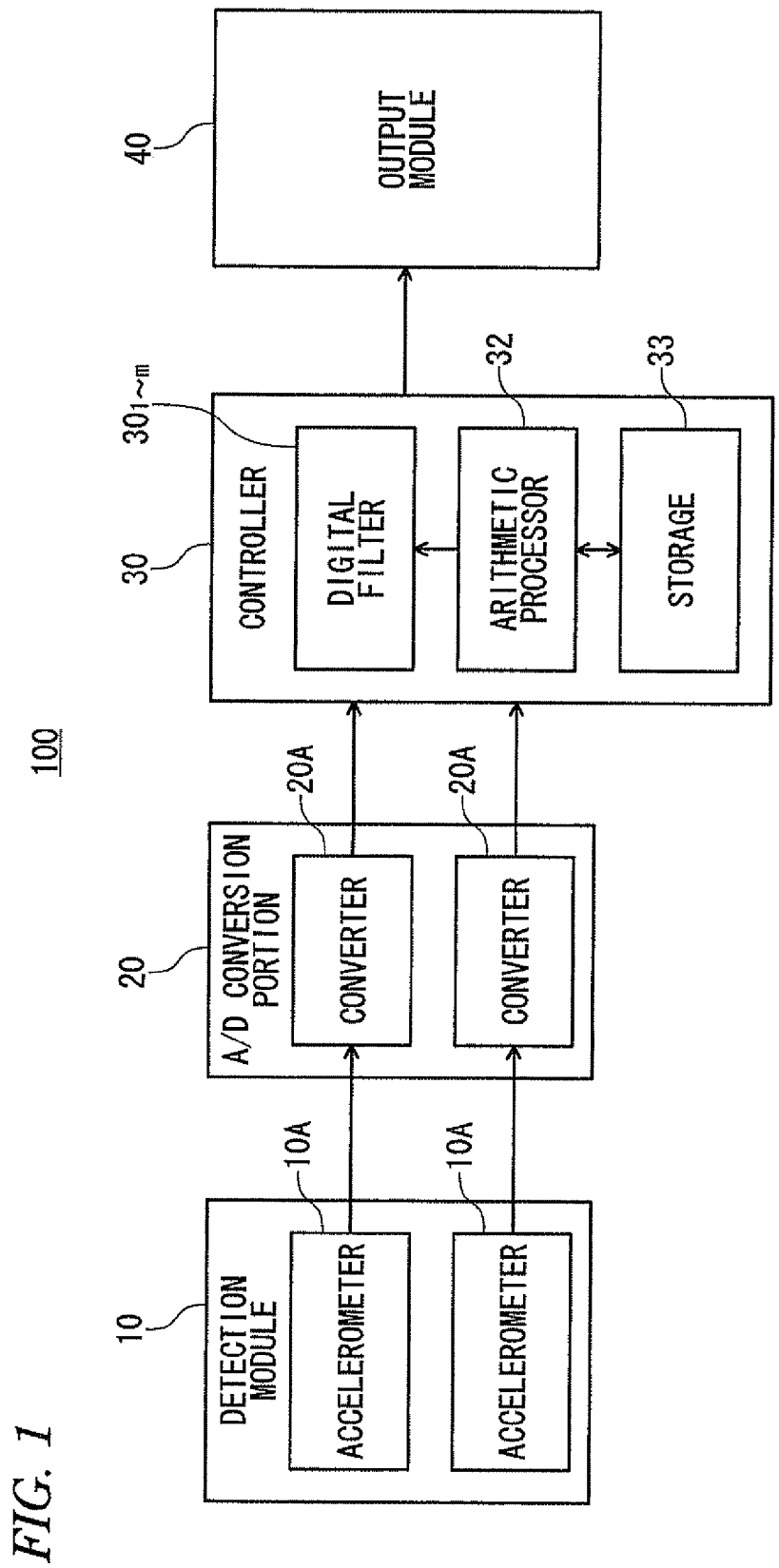
FIG. 1 is a function block diagram of a long-period vibration sensor according to an embodiment of the invention.

A long-period vibration sensor (hereinafter referred to as vibration sensor) 100 in an embodiment of the invention includes a detection module 10, an A/D conversion portion 20, a controller 30, and an output module 40, for example, as shown in FIG. 1.

The detection module 10 has two overdamped accelerometers 10A and 10A. Each overdamped accelerometer 10A is disposed to be able to detect vibrations in horizontal directions of two axes perpendicular to each other, respectively.

Figure 2:
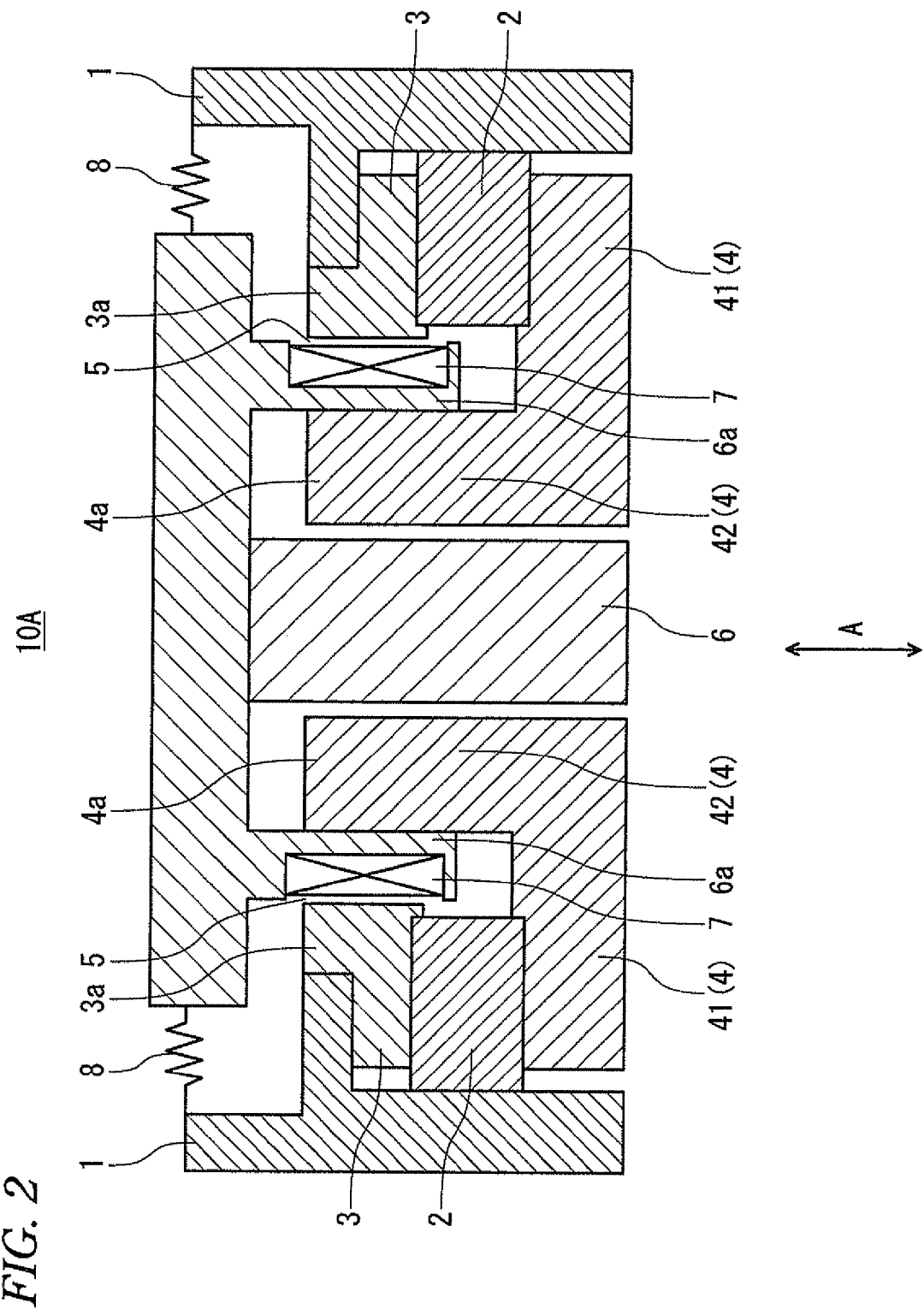
FIG. 2 is a schematic view showing an overdamped accelerometer.

Each overdamped accelerometer 10A includes a casing 1, a magnet 2 fixed to the inside of the casing 1, a top plate 3 and a back plate 4 holding the magnet 2 therebetween, a detection coil 7 disposed between magnetic poles 3a and 4a formed due to the magnet 2, a bobbin 6 holding the detection coil 7, a pair of support springs 8 and 8 supporting the bobbin 6 in the casing 1 so that the bobbin 6 can vibrate in a predetermined direction (direction A), etc., for example, as shown in FIG. 2.

The overdamped accelerometer 10A serves as a detector in which an electrokinetic detector using the principle that "an electromotive force proportional to the velocity of the motion is generated in a conductor when the conductor makes a motion (vibration) in a magnetic field" is electromagnetically damped to expand a region proportional to acceleration.

The casing 1 is a part corresponding to a housing of the overdamped accelerometer 10A.

The magnet 2 is formed out of a permanent magnet having a ring-like shape in plan view. The magnet 2 is disposed inside the casing 1 to form a magnetic field inside the casing 1.

The magnet 2 is fixedly provided in the inside of the casing 1 so as to be held between the top plate 3 and the back plate 4 which are formed into ring-like shapes in plan view in the same manner.

Each of the top plate 3 and the back plate 4 is formed out of a magnetic material.

The top plate 3 has substantially the same ring-like shape as the magnet 2 in plan view. The top plate 3 is disposed on an upper surface of the magnet 2. An outside magnetic pole 3a is formed in an inner side portion of the top plate 3.

The back plate 4 includes a mounting portion 41 and a standing portion 42. The mounting portion 41 has a ring-like shape in plan view. The magnet 2 is mounted on the mounting portion 41. The standing portion 42 stands up from an inner side portion of the mounting portion 41. An inside magnetic pole 4a is formed in a front end portion of the standing portion 42 so as to be opposed to the outside magnetic pole 3a.

An air gap 5 which has a ring-like shape in plan view is formed between the outside magnetic pole 3a and the inside magnetic pole 4a.

The bobbin 6 is formed out of a non-magnetic material such as copper or an aluminum alloy. The bobbin 6 is supported in the casing 1 by the paired support springs 8 and 8, so that the bobbin 6 can vibrate in a predetermined vibrating direction (direction A).

The bobbin 6 is provided with a thick holding portion 6a, which is disposed in the air gap 5 so that the holding portion 6a can wind the detection coil 7. Due to the holding portion 6a provided thus, the bobbin 6 can be damped (overdamped).

In the bobbin 6, an electromotive force generated by the motion of the bobbin 6 in the magnetic field flows into the detection coil 7 to generate a counter electromotive force, which serves for damping.

The detection coil 7 is a coil wound around the holding portion 6a of the bobbin 6. The detection coil 7 is positioned in the ring-like air gap 5 formed between the magnetic poles 3a and 4a.

The output voltage of the detection coil 7 is outputted as an analog signal to the A/D conversion portion 20.

The paired support springs 8 and 8 are, for example, leaf springs or the like having one ends fixed to a wall surface of the casing 1 and the other ends connected to the bobbin 6. Thus, the support springs 8 and 8 support the bobbin 6 so that the bobbin 6 can vibrate in the direction A.

Each support spring 8 gives the bobbin 6 a restoring force derived from a predetermined spring constant and a displacement in accordance with the vibration of the bobbin 6.

Figure 3:
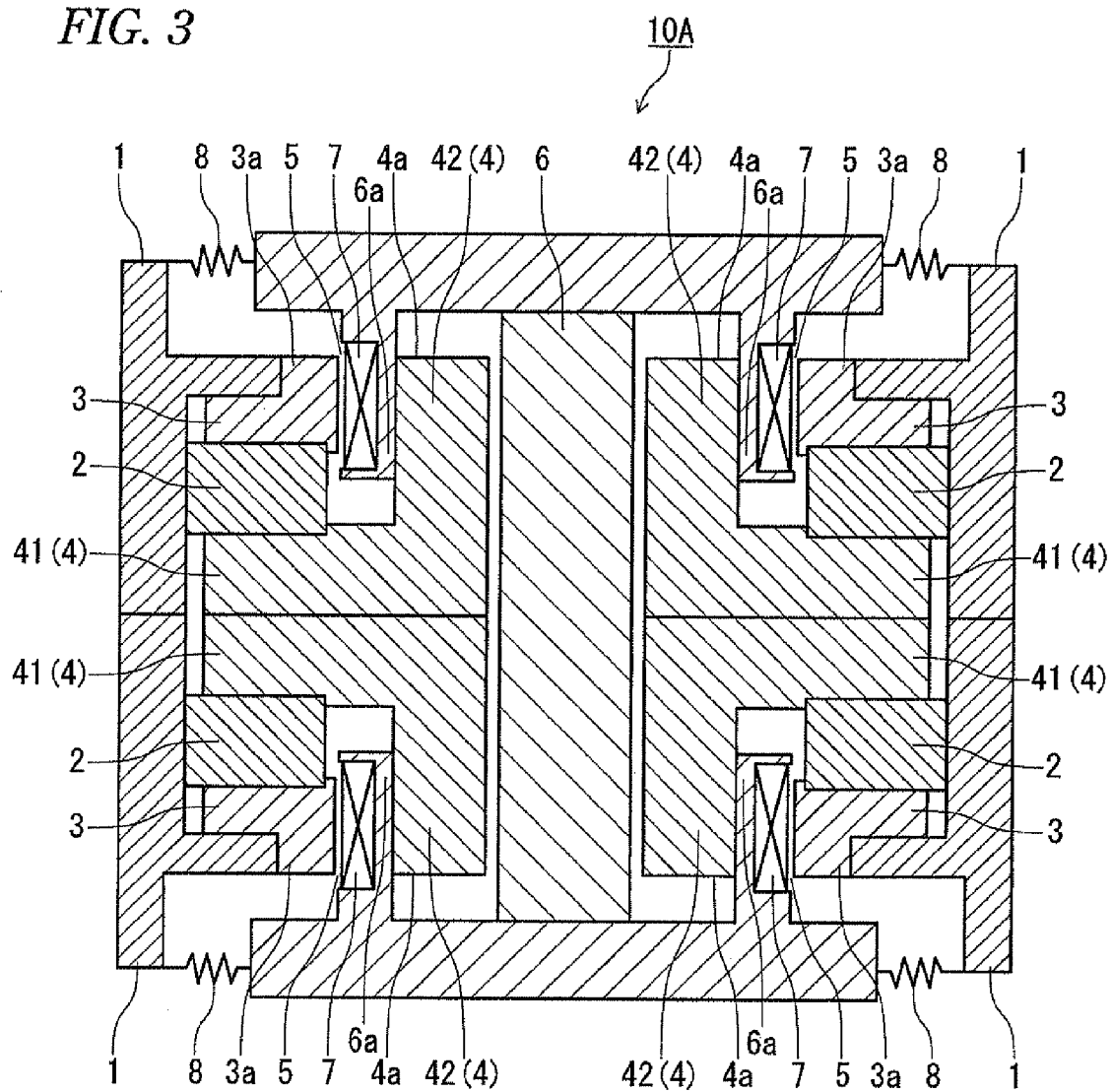
FIG. 3 is a schematic view showing another overdamped accelerometer.

As another aspect of the overdamped accelerometer, the two overdamped accelerometers 10A may be combined vertically so that the upper overdamped accelerometer 10A is symmetrical to the lower overdamped accelerometer 10A with respect to a line, as shown in FIG. 3.

Even in this configuration, a voltage is outputted from the detection coil 7 when the bobbin 6 is damped.

The A/D conversion portion 20 has A/D converters 20A and 20A corresponding to the overdamped accelerometers 10A and 10A.

Each A/D converter 20A converts an analog signal of a voltage outputted from corresponding one of the overdamped accelerometers 10A into a digital signal, and outputs the digital signal to the controller 30.

The controller 30 has a plurality of digital filters $31_{1-m}$, an arithmetic processor 32, etc.

The plurality of digital filters $31_{1-m}$ have different frequency characteristics from one another.

One and the same acceleration is applied at a target frequency (0.1 Hz) with respect to a reference frequency (0.5 Hz) by a test coil. The plurality of digital filters $31_{1-m}$ can be selected based on the ratio between output values of voltages. In such a manner, processing can be performed with the ratio between output values of voltages from at least two points.

The number of the plurality of digital filters $31_{1-m}$ is not limited particularly.

The digital signal outputted from each A/D converter 20A is supplied to one digital filter $31_n$ selected from the plurality of digital filters $31_{1-m}$ by a selection process (which will be described later) performed by the arithmetic processor 32.

The arithmetic processor 32 is arranged as a computer portion, which is not shown but includes a CPU (Central Processing Unit), a RAM (Random Access Memory) and a ROM (Read Only Memory). The arithmetic processor 32 executes a selection process and a correction process. In the selection process, one digital filter $31_n$ is selected from the plurality of digital filters $31_{1-m}$ based on an output value of a voltage outputted from each overdamped accelerometer 10A. In the correction process, the output value is corrected using the digital filter $31_n$ selected in the selection process.

By executing these processes, the arithmetic processor 32 functions as a selection module and a correction module.

Specifically, a storage 33 is connected to the arithmetic processor 32.

The plurality of digital filters $31_{1-m}$ and output values set for the plurality of digital filters $31_{1-m}$ in advance are stored in association with each other in the storage 33.

With reference to the storage 33, the arithmetic processor 32 selects one digital filter $31_n$ from the plurality of digital filters $31_{1-m}$ based on the output value of the voltage outputted from the overdamped accelerometer 10A.

Preferably, the arithmetic processor 32 selects one digital filter $31_n$ which can detect a frequency in a range of from 0.04 Hz to 0.5 Hz.

Next, the arithmetic processor 32 corrects an output value of a voltage outputted from each overdamped accelerometer 10A using the selected digital filter $31_n$.

Figure 4:
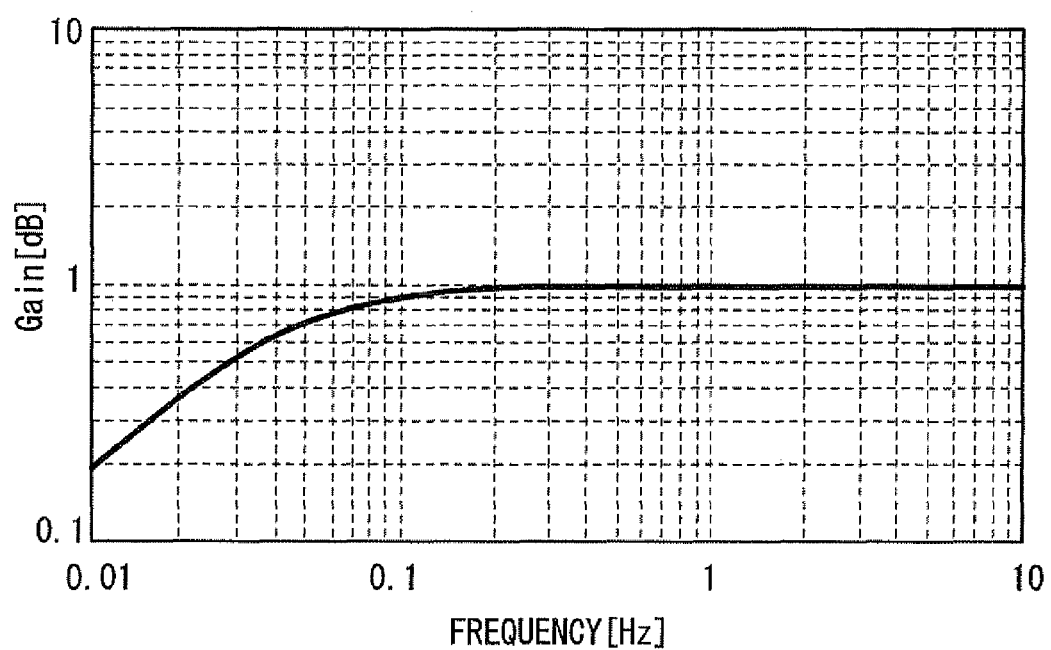
FIG. 4 is a view showing an example of frequency characteristic of the overdamped accelerometer.
Figure 5:
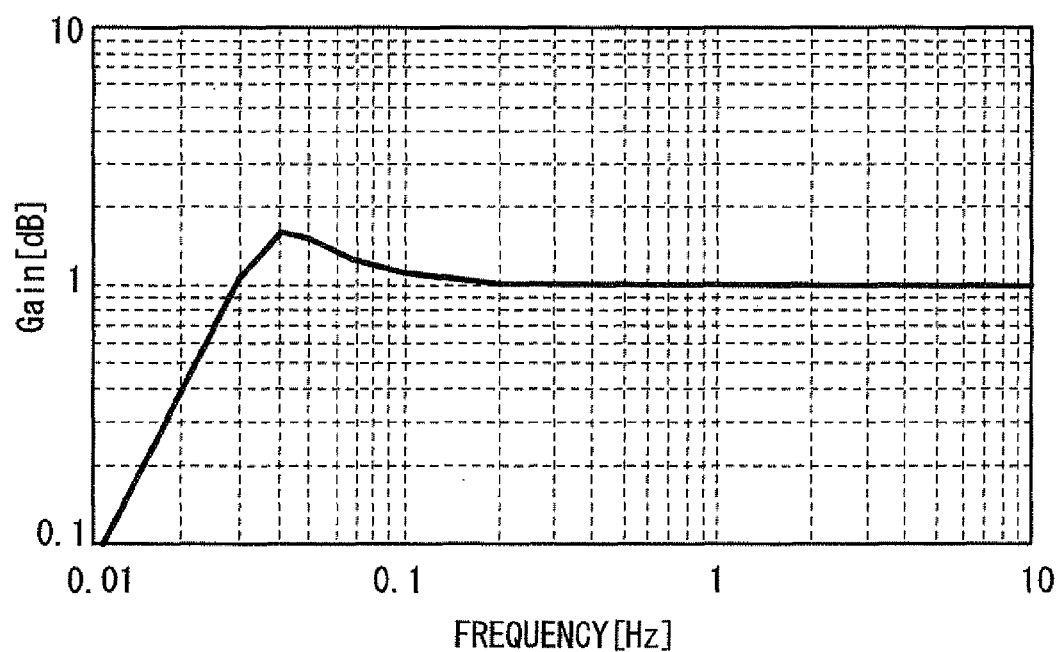
FIG. 5 is a view showing an example of frequency characteristic of a digital filter.

Here, FIG. 4 shows an example of frequency characteristic of the overdamped accelerometer 10A, and FIG. 5 shows an example of frequency characteristic of the selected digital filter $31_n$.

Figure 6:
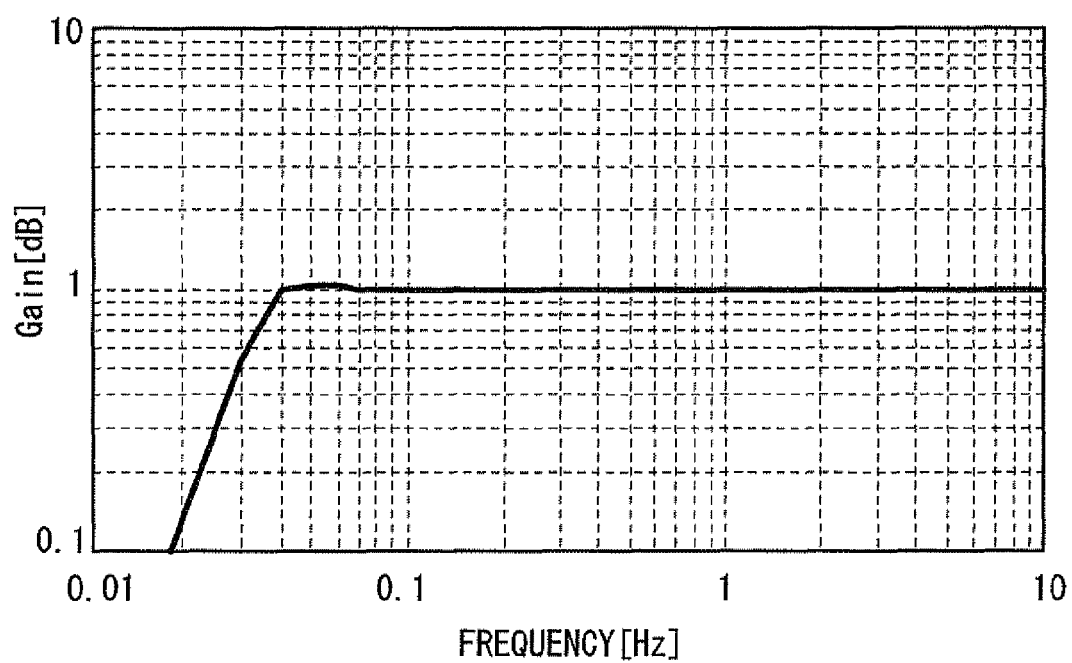
FIG. 6 is a view showing frequency characteristic of the long-period vibration sensor according to the embodiment.

In addition, FIG. 6 shows frequency characteristic of the overdamped accelerometer 10A on which the selection process and the correction process have been executed.

In FIGS. 4 to 6, the vertical axis designates a gain [dB], and the horizontal axis designates a frequency [Hz].

The principle characteristic of the overdamped accelerometer 10A is close to an electrokinetic detector. Therefore, the overdamped accelerometer 10A is not suitable for measuring a low-frequency region (or for measuring long-period vibrations). For example, it can be understood from FIG. 4 that the overdamped accelerometer 10A is not suitable for measuring a region not higher than 0.2 Hz.

Therefore, in the embodiment, the selection process and the correction process are executed so that the output of the overdamped accelerometer 10A having the frequency characteristic as shown in FIG. 4 can be corrected by the digital filter $31_n$ having the frequency characteristic as shown in FIG. 5.

Specifically, a characteristic curve showing a decreasing trend in a low-frequency region not higher than 0.2 Hz before the correction process as shown in FIG. 4 is corrected into a characteristic curve showing a substantially constant value in a frequency region not lower than 0.04 Hz after the correction process as shown in FIG. 6.

In this manner, the frequency characteristic of the overdamped accelerometer 10A in the low-frequency region is corrected so that long-period vibrations can be measured.

Particularly, it is preferable that the correction is performed so that a frequency in a range of from 0.04 Hz to 0.5 Hz which is a concern, for example, in high-rise buildings or the like, can be detected.

After executing the selection process and correction process to correct the output values of the respective overdamped accelerometers 10A, the arithmetic processor 32 converts the corrected output values into accelerations and executes a combination process on the accelerations.

Next, the arithmetic processor 32 determines whether an acceleration value obtained by the combination process is lower than a predetermined start-up level which has been set in advance or not. The arithmetic processor 32 determines that an alarm is to be outputted when the acceleration value obtained by the combination process is not lower than the predetermined start-up level, and determines that an alarm is not to be outputted when the acceleration value obtained by the combination process is lower than the predetermined start-up level.

The output module 40 is provided with a not-shown speaker. When the controller 30 determines that an alarm is to be outputted, the output module 40 makes a sound for an alarm.

Figure 7:
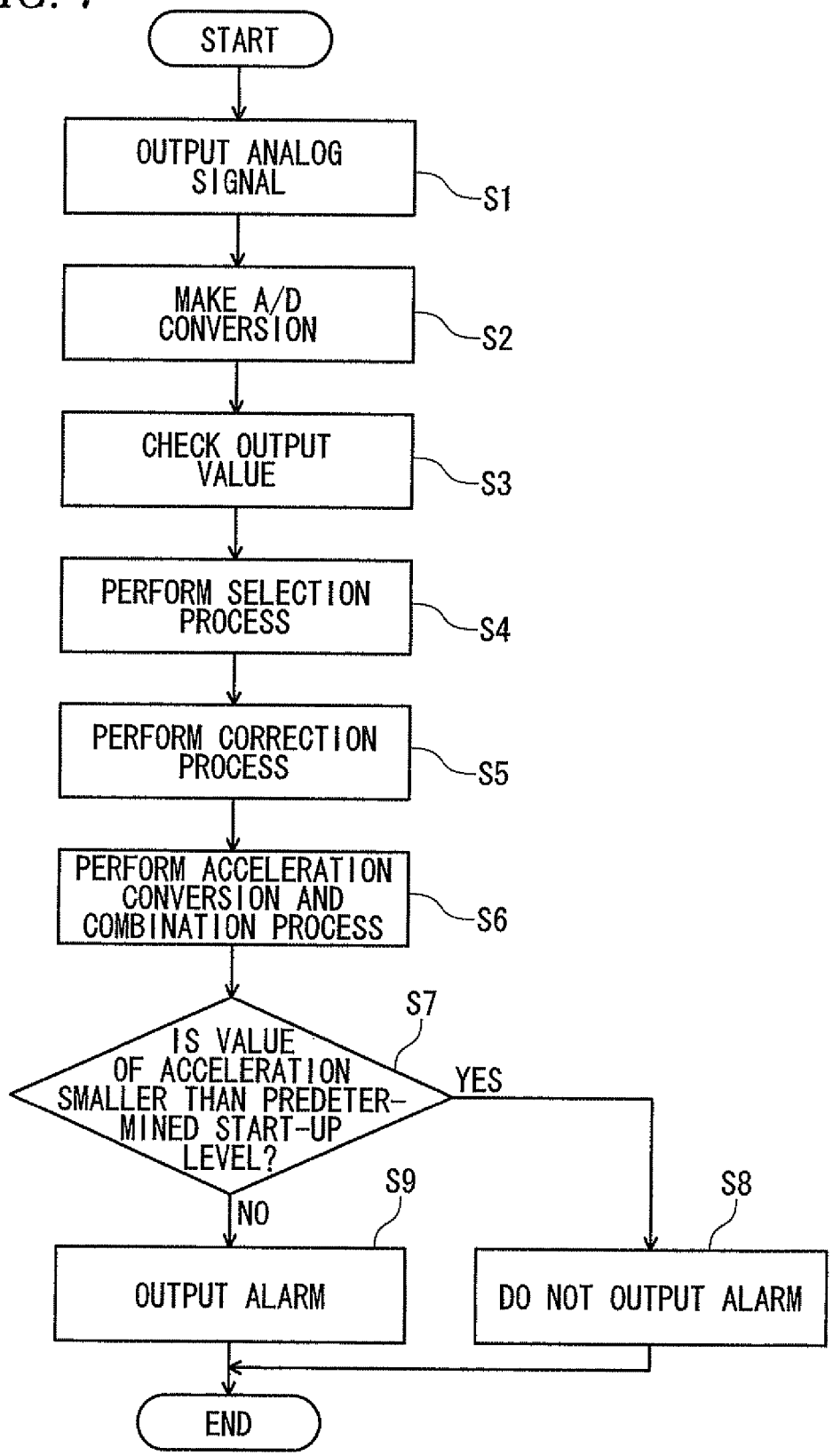
FIG. 7 is a view showing a method for correcting an output value of the long-period vibration sensor according to the embodiment.

Next, a method for correcting an output value of the vibration sensor 100 will be described with reference to the flow chart of FIG. 7.

First, in Step S1, an analog signal of a voltage is outputted from the detection coil 7 of each overdamped accelerometer 10A (voltage output step).

Next, in Step S2, the A/D conversion portion 20 converts the analog signal outputted from each overdamped accelerometer 10A into a digital signal.

Next, in Step S3, the arithmetic processor 32 checks the output value outputted from each overdamped accelerometer 10A.

Next, in Step S4, the arithmetic processor 32 executes a selection process for selecting one digital filter $31_n$ from the plurality of digital filters $31_{1-m}$ based on the output value (selection step).

Next, in Step S5, the arithmetic processor 32 executes a correction process for correcting the output value using the selected digital filter $31_n$ (correction step).

Next, in Step S6, the arithmetic processor 32 executes an acceleration conversion and combination process.

Next, in Step S7, the arithmetic processor 32 determines whether an acceleration value obtained by the combination process is lower than a predetermined start-up level which has been set in advance or not. When the acceleration value obtained by the combination process is lower than the predetermined start-up level (YES in Step S7), the arithmetic processor 32 determines that an alarm is not to be outputted in a subsequent Step S8.

On the other hand, when the acceleration value obtained by the combination process is not lower than the predetermined start-up level (NO in Step S7), the arithmetic processor 32 determines that an alarm is to be outputted in a subsequent Step S9 so that the alarm is outputted by the output module 40. Then, this processing is terminated.

As described above, the vibration sensor 100 in the embodiment has overdamped accelerometers 10A, a plurality of digital filters $31_{1-m}$ having different frequency characteristics from one another, a selection module (arithmetic processor 32) for selecting one digital filter $31_n$ from the plurality of digital filters $31_{1-m}$ based on an output value of a voltage outputted from each of the overdamped accelerometers 10A, and a correction module (arithmetic processor 32) for correcting the output value using the selected digital filter $31_n$.

Thus, the frequency characteristics of the overdamped accelerometers 10A are corrected by the selected digital filter $31_n$ so that long-period vibrations can be detected by the overdamped accelerometers 10A which are not suitable for detecting the long-period vibrations.

Each of such overdamped accelerometers 10A is smaller in size than a pendulum-type quake detection sensor, and the detection level can be changed easily.

In addition, the overdamped accelerometer 10A does not need any power supply. The overdamped accelerometer 10A is lower in power consumption, smaller in the number of parts and simpler in structure than a servo-type accelerometer.

It is therefore possible to provide a long-period vibration sensor which is simple in structure, excellent in user-friendliness and low in power consumption, and a method for correcting an output value of the long-period vibration sensor.

In addition, according to the embodiment, a storage (storage 33) in which the plurality of digital filters $31_{1-m}$ and output values set for the plurality of digital filters $31_{1-m}$ respectively in advance have been associated with each other is provided. With reference to the storage, the selection module selects one digital filter $31_n$ from the plurality of digital filters $31_{1-m}$ based on the output value of the voltage outputted from each of the overdamped accelerometers 10A.

It is therefore possible to select an optimal digital filter $31_n$ to improve the yield even when there is variation among frequency characteristics of individual overdamped accelerometers 10A.

In addition, according to the embodiment, the selection module selects one digital filter $31_n$ which can detect a frequency in a range of from 0.04 Hz to 0.5 Hz.

It is therefore possible to accurately detect long-period vibrations ranging from 0.04 to 0.5 Hz, which is a concern, for example, in high-rise buildings or the like.

The invention is not limited to the aforementioned embodiment, but various improvements and design changes can be made without departing from the gist of the invention.

For example, the configuration in which the selection module selects one digital filter $31_n$ from the plurality of digital filters $31_{1-m}$ based on the output value of the voltage outputted from each of the overdamped accelerometers 10A with reference to the storage 33 has been described in the aforementioned embodiment. However, according to another method for selecting an optimal one from the plurality of digital filters $31_{1-m}$, for example, a configuration may be made in such a manner that a correction process is performed using the plurality of digital filters $31_{1-m}$ one by one so that an optimal digital filter can be selected based on thus obtained correction values.

What is claimed is:

1. A long-period vibration sensor comprising:
   an overdamped accelerometer including a casing, a magnet fixed to the inside of the casing, a detection coil disposed between magnetic poles formed due to the magnet, a bobbin configured to hold the detection coil, and a support spring configured to support the bobbin in the casing so that the bobbin can vibrate in a predetermined direction, a voltage being outputted from the detection coil when the bobbin is damped;
   a plurality of digital filters having different frequency characteristics from one another;
   a selection module configured to select one digital filter from the plurality of digital filters based on an output value of the voltage outputted from the overdamped accelerometer; and
   a correction module configured to correct the output value of the voltage outputted from the overdamped accelerometer using the digital filter selected by the selection module.

2. The long-period vibration sensor according to claim 1, further comprising:
   a storage configured to store the plurality of digital filters and output values set for the plurality of digital filters respectively in advance in a state that the plurality of digital filters are associated with the corresponding output values,
   wherein:
   with reference to the storage, the selection module is configured to select one digital filter from the plurality of digital filters based on the output value of the voltage outputted from the overdamped accelerometer.

3. The long-period vibration sensor according to claim 1, wherein:
   the selection module is configured to select one digital filter which can detect a frequency in a range of from 0.04 Hz to 0.5 Hz.

4. The long-period vibration sensor according to claim 2, wherein:
   the selection module is configured to select one digital filter which can detect a frequency in a range of from 0.04 Hz to 0.5 Hz.

5. A method for correcting an output value of a long-period vibration sensor according to claim 1, comprising:
   outputting a voltage from the detection coil when the bobbin is damped;
   selecting one digital filter from the plurality of digital filters based on an output value of the voltage outputted; and
   correcting the output value using the digital filter selected.

* * * * *